2,589,513

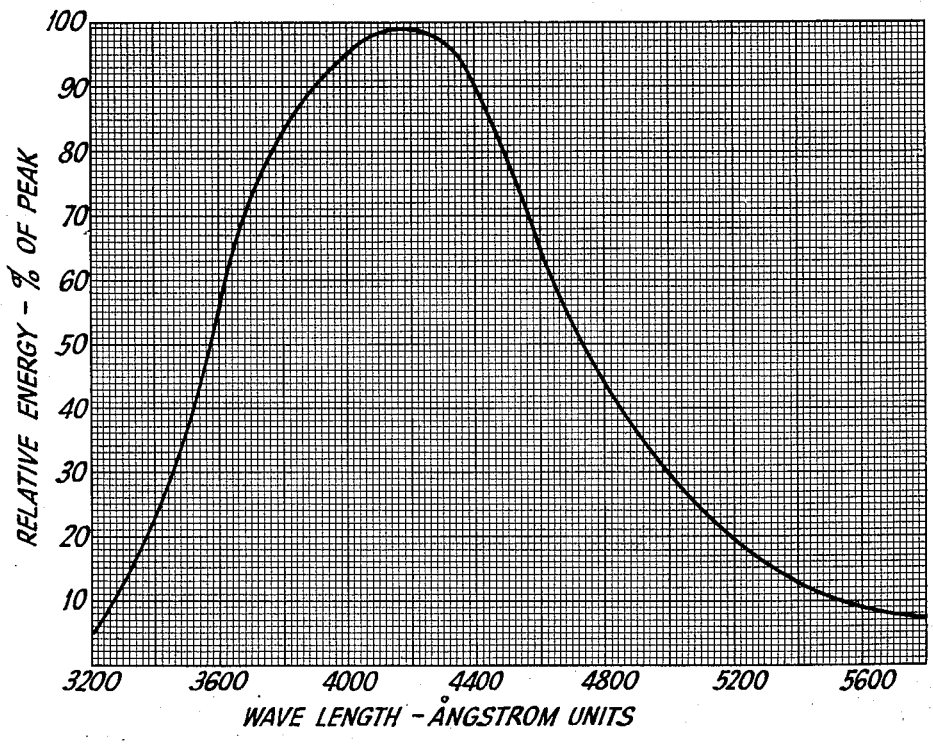
SPECTRAL ENERGY DISTRIBUTION
OF $CaMg(SiO_3)_2:Ti$
INVENTOR
ARTHUR L. J. SMITH Patented Mar. 18, 1952

UNITED STATES PATENT OFFICE 2,589,513

METHOD OF MAKING TITANIUM ACTIVATED CALCIUM MAGNESIUM SILICATE PHOSPHOR

Arthur L. J. Smith, Lancaster, Pa., assignor to Radio Corporation of America, a corporation of Delaware Application November 23, 1948, Serial No. 61,638

2 Claims. (Cl. 252—301.6)

This invention relates to luminescent materials, and in particular to phosphor materials that fluoresce upon excitation by cathode rays, light, including ultraviolet light, X-rays or other forms of energy.

In many types of cathode ray tubes, particularly those used in television viewing tubes, a phosphor screen is used which emits substantially white light upon excitation by the electron beam. The simplest means of obtaining this physiologically white light is to use two phosphors, one emitting in the blue portion of the spectrum, and the other in the yellow portion. When properly proportioned, this mixture of yellow and blue appears white to the human eye. Under certain conditions of excitation, any pair of phosphors, one of which emits yellow and the other blue, will give this white light.

In television viewing tubes using a mixed phosphor screen on the end face of the tube envelope, a visual picture is developed by the scanning of an electron beam back and forth across the screen face. The high lights and shadows of the picture are formed by varying the intensity of the electron beam from point to point. This is done, as is well known, by applying an incoming television video signal to the control grid of the electron gun of the tube. All phosphors, however, do not respond in the same fashion to very intense electron beams. Zinc and zinc-cadmium sulfide phosphors reach a saturation value. That is, a point of intensity is reached beyond which no further increase of beam current produces a corresponding increase of light output. Zinc beryllium silicate phosphors, on the other hand, continue to emit visible radiation in an amount proportional to the current density, at all current densities and they do not have a saturation value.

One of the phosphor screens previously used has been a mixture of blue emitting zinc sulfide and yellow emitting zinc beryllium silicates, particularly in those tubes where high current densities were required. This had the advantage of utilizing the linear output of the zinc beryllium silicate phosphor, and hence gave a pattern much brighter than if an all sulfide screen was used, together with a much improved contrast ratio. An objection to this type of screen was in the shift of color. If the screen was prepared to give a white light at some low current density, then the high lights of the picture, which are caused by increased current density, appeared yellow instead of white, because the blue zinc sulfide became saturated and no longer emitted radiation in an amount proportional to the current, while the zinc-beryllium silicate continued to do so. It is a distinct advantage, therefore, to have a screen material either of a single phosphor, or of a mixture of phosphors having the same current saturation characteristics, if color shifts of screens is to be avoided.

It is, therefore, an object of my invention to provide a blue fluorescing phosphor material having little or no change in color due to variations of the current density of a scanning electron beam.

It is a further object of my invention to provide an improved phosphor material having high efficiency of luminescence.

It is a further object of my invention to provide an improved inorganic silicate phosphor of high efficiency.

Another object of my invention is to provide an efficient blue fluorescing phosphor formed from a silicate of calcium and magnesium.

A further object of my invention is to provide a phosphor of a silicate of calcium and magnesium activated by titanium oxide.

The figure illustrates, graphically, the energy distribution curve for a calcium-magnesium silicate phosphor activated by titanium, according to my invention.

I have found that a luminescent phosphor material having good efficiency in the blue and ultra-violet portion of the spectrum can be formed of a calcium-magnesium silicate having titanium oxide added as an activator. The material formed is a definite silicate compound of the composition $CaO \cdot MgO \cdot 2SiO_2$, the formula of the mineral diopside. The phosphor formed of this material and prepared according to my invention is free flowing and of higher efficiency than other similar silicates.

The calcium-magnesium silicate or diopside phosphor may be formed by mixing together, in proportionate amounts, 1 mol. $CaCO_3$, 1 mol. $MgCO_3$, between 2.2 and 2.3 mols $SiO_2$, and 0.05 mol. of $TiO_2$. This mixture is formed into a slurry by the addition of double distilled water. To provide a flux for the phosphor material, a second slurry is made up, composed of 0.2 mol. of $CaCO_3$, 0.2 mol. $MgCO_3$, 100 mols. $H_2O$ (double distilled), 0.4 mol. HCl acid and 0.2 mol. $H_2SO_4$ acid. The ingredients forming the second slurry are added in the order listed above, the acid being added cautiously to the carbonates. The first and second slurries are mixed together and ball milled from seven to fifteen hours in a pebble ball mill, after which the material is separated from the pebbles, and dried at between 150° to 180° centigrade for twelve hours or more. The resultant soft cake is broken up and powdered and then placed into a silica-glass crucible. The silica crucible containing the phosphor charge is placed into a furnace previously brought up between 600° C. and 700° C. The temperature is then raised to 1250° C. and the phosphor material is fired at this last temperature for ninety minutes. After firing, the material is removed and cooled in air.

The flux materials are removed by washing. Water is added to the fired phosphor, which is broken up to form a suspension. The silicate suspension is separated from any large aggregates present by elutriation or a separation by settling. The coarse, gritty material is discarded and after the remaining suspension has been allowed to settle for fifteen to twenty minutes, the supernatant liquid is decanted and the remaining liquid removed by any convenient method, such as suction applied through a porous medium, as, for example, a 60 millimeter diameter immersion fritted disc. The remaining material is washed and filtered and then the silicate is dried for between twelve to nineteen hours at 150° C. to 200° C.

The above preparation of calcium-magnesium silicate is a method in which an efficient blue fluorescing phosphor is obtained. The calcium-magnesium silicate phosphor was first made without the use of a flux material. However, I have found that when a flux was used in the manner described above, the resultant phosphor had a greatly improved efficiency over that prepared without flux and under the same preparatory and firing conditions.

The use of a flux introduces a low melting point solvent, which facilitates the chemical reactions taking place during this firing process. That is, the sulfates and chlorides comprising the flux tend to become liquid at the high firing temperatures used, and tend to dissolve some of the intermediate products so that the formation of the calcium magnesium silicate proceeds at a much faster rate. Since diffusion is the limiting factor in solid state reactions, any process, which hastens the diffusion of ingredients, increases the speed of the reaction. This is accomplished by the flux.

The calcium and magnesium added in the flux slurry are in the same ratio as they are in the phosphor mix in order to maintain the desired ratio in the final mix, since the fluxes also act as reactants. The materials which can be used as a fluxing material are those which will decompose to form chlorides (or halides, if desired) and sulfates. The fluxing materials should have low melting points and should be able to be washed out after the firing step. However, in the formation of the calcium-magnesium silicate phosphor, the fluxes should not be any of the metals, sodium, potassium or lithium, as the formation of the silicates of these metals tend to kill the efficiency of the phosphor.

The flux material used may also be a dry mixture of, or having the same proportions of 0.1 mol of anhydrous $MgSO_4$, 0.1 mol of anhydrous $CaCl_2$, 0.1 mol of anhydrous $MgNH_4Cl_3$ and 0.1 mol of $CaSO_4$. The use of magnesium ammonium chloride in the flux material is advocated to prevent hydrolysis. The materials used are of a selected C. P. grade, or a luminescent pure grade. As described above, the flux is a chloride-sulfate flux. However, a chloride flux may be used entirely and the sulfate omitted. But, it has been found that if the sulfate is left out of the flux, there is a drop of 10%–20% in the efficiency of the phosphor. However, if no flux is used in the preparation, the phosphor material loses 50% to 60% in efficiency.

The titanium activator used provides a peak emission in the blue region of the spectrum. As shown by the figure, the peak emission is around 4200 angstrom units. To provide this peak emission, the titanium oxide material added to the phosphor mixture may be between 1 to 10 mol per cent of the silicate mixture with the optimum at 5 mol percent. However, the amount of titanium added may be varied up to 20 mol per cent. Varying the amount of titanium oxide added will provide a corresponding shift in the peak emission proportional to the amount of titanium oxides used. For example, a 10% increase in the amount of titanium oxide will shift the peak from 4200 angstrom units to 4300 angstrom units. Increase of $TiO_2$ above 5 mol per cent increases the grittiness and coarseness of the product.

The titanium activator may be added to the mix in any form that will provide the titanium dioxide necessary to replace the silica dioxide in the crystal lattice. For example, the titanium could be added as titanium tetra-chloride mixed in a water suspension of calcium and magnesium carbonates to form titanium hydroxide and hydrochloric acid, which will react with the carbonates of the mix.

The described methods of making the calcium-magnesium silicate phosphor may also be varied in the following manner, as for example, instead of adding the flux material separately, the quantity of calcium carbonate (oxide) in the phosphor mix may be increased from 1 mol to 1.2 mol and the magnesium carbonate (oxide) from one mol to 1.1 mol, and 0.2 mol of concentrated HCl and 0.2 mol of concentrated $H_2SO_4$ added to the slurry. The hydrochloric and sulphuric acids will react with part of the calcium and magnesium carbonates (oxides) to form the required sulphate and chloride fluxes.

The calcium-magnesium silicate phosphor may be also made from other compounds of the metals and of silica. For example, the calcium-magnesium silicate phosphor may be formed entirely by a thermal synthesis in which the oxides of calcium, magnesium, silicon and titanium are formed into a dry mix before firing.

The firing temperatures given above in the preparation of the silicate phosphor are by way of example only. It is well known that a longer firing time will give larger crystals. The temperature of firing and the time of firing is largely determined by the size of the batches used. As, for example, a 30 gram batch of silicate phosphor material may be fired at 1175° for 30 minutes, while a 400 gram batch of the same material should be fired at 1250° for 1½ hours to provide essentially the same phosphor characteristics. This is largely a heat transfer problem and will vary from furnace to furnace. Longer firing times and higher temperatures will increase the particle size of the phosphor as well as lower its efficiency, particularly in small batches. Also, if the firing time is too short, the efficiency of the phosphor is lowered, because reaction will be incomplete.

As shown in the figure, the peak efficiency of the titanium activated calcium-magnesium silicate, made by the above-described process, lies in the blue region around 4200 angstrom units. This phosphor material has been successfully used as a blue component in an all silicate screen formed by the mixing of this blue phosphor with a zinc beryllium silicate phosphor producing a yellow fluorescence. The two silicate phosphors, when mixed in the proper proportions, produce a white fluorescent screen material showing no color shift, since both compounds have almost identical current saturation characteristics. The use of the blue titanium activated calcium-magnesium silicate with a yellow fluorescing zinc cadmium sulfide is not too satisfactory as the sulfide does not have a similar current saturation characteristic as that of the silicate phosphor. However, this titanium activated calcium-magnesium silicate phosphor may be mixed in the proper proportions with any yellow fluorescing phosphor material having the same current saturation characteristics to produce a white fluorescent screen material.

While certain specific embodiments have been illustrated and described, it will be understood that various changes and modifications may be made therein without departing from the spirit and scope of the invention.

What I claim as new is:

1. The method of producing a titanium activated luminescent silicate compound having the chemical composition $CaO \cdot MgO \cdot 2SiO_2$ comprising the steps of, preparing a mixture of silica and metal compounds of calcium and magnesium in a molar ratio calculated to produce said composition, said compounds being those which break down upon heating to form oxides of calcium and magnesium, including in said mixture sufficient titanium compound to give between 1.0 mol per cent and 10.0 mol per cent of $TiO_2$ and a flux including the sulfates and chlorides of calcium and magnesium, firing said mixture and flux together to form said single silicate compound of calcium and magnesium activated with titanium.

2. The method of producing a titanium activated luminescent silicate compound having the chemical composition $CaO \cdot MgO \cdot 2SiO_2$ comprising the steps of, preparing a mixture of silica and metal compounds of calcium and magnesium in a molar ratio calculated to produce said composition, said metal compounds being those which break down upon heating to form oxides of calcium and magnesium, including in said mixture sufficient titanium compound to give approximately 5.0 mol per cent of $TiO_2$ and a flux including the sulfates and chlorides of calcium and magnesium, firing said mixture and flux together to form said single silicate compound of calcium and magnesium activated with titanium.

ARTHUR L. J. SMITH.

REFERENCES CITED

The following references are of record in the file of this patent:

UNITED STATES PATENTS

| Number | Name | Date |
| --- | --- | --- |
| 2,415,129 | Froelich | Feb. 9, 1947 |
| 2,473,960 | Kroger | June 21, 1949 |

OTHER REFERENCES

Philips Technical Review, 1947, vol. 9, No. 7, p. 216.